US008326033B2

(12) United States Patent
Haikin

(10) Patent No.: US 8,326,033 B2
(45) Date of Patent: Dec. 4, 2012

(54) RULE-BASED COLOR MANAGEMENT AND IMAGE PROCESSING SYSTEM

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 12/757,957

(22) Filed: Apr. 9, 2010

(65) Prior Publication Data
US 2011/0249896 A1    Oct. 13, 2011

(51) Int. Cl.
*G06K 9/00* (2006.01)
(52) U.S. Cl. .................... 382/167; 382/162; 382/166
(58) Field of Classification Search ............ 382/162, 382/166, 167; 358/1.9, 518, 1.15, 2.1, 1.6; 709/217
See application file for complete search history.

(56) References Cited

U.S. PATENT DOCUMENTS

| | | | |
|---|---|---|---|
| 6,480,299 B1 * | 11/2002 | Drakopoulos et al. | 358/1.9 |
| 6,518,975 B1 | 2/2003 | Kulkarni et al. | |
| 6,831,999 B2 | 12/2004 | Haikin | |
| 7,095,529 B2 | 8/2006 | Krueger et al. | |
| 7,266,238 B2 | 9/2007 | Haikin | |
| 7,317,827 B2 | 1/2008 | Munsil | |
| 7,433,514 B2 | 10/2008 | Sloan | |
| 7,436,995 B2 * | 10/2008 | Ito et al. | 382/162 |
| 7,538,917 B2 * | 5/2009 | Rich et al. | 358/518 |
| 7,583,405 B2 * | 9/2009 | Harrington et al. | 358/1.9 |
| 7,612,912 B2 * | 11/2009 | Rumph et al. | 358/1.9 |
| 8,031,369 B2 * | 10/2011 | Ducato | 358/2.1 |
| 2003/0122842 A1 | 7/2003 | Newman | |
| 2007/0046958 A1 | 3/2007 | Hoof et al. | |

FOREIGN PATENT DOCUMENTS

JP        2007189674 A    *    7/2007

OTHER PUBLICATIONS

Frederick Hayes-Roth, "Rule-Based Systems", Communications of the ACM, Vol. 28, No. 9, pp. 921-932, Sep. 1985
Chung Chan, "Rules and Rule Chaining", available at <http://web.mit.edu/chungc/6.034/l1.html>, last modified Oct. 4, 2001.
Chung Chan, "Rete—Memorization of Matched Rule", available at <http://web.mit.edu/chungc/6.034/l5.html>, last modified Jul. 9, 2002.

(Continued)

*Primary Examiner* — Anh Hong Do
(74) *Attorney, Agent, or Firm* — Fitzpatrick, Cella, Harper & Scinto

(57) ABSTRACT

Color management converting source-side color images into destination-side color images. A module library includes module entries corresponding to function modules implementing color processing functionalities. Each module entry includes a module locator, and some include a profile interface definition. A profile library includes profile entries corresponding to sources of parameters. Profile entries include a profile locator and a profile interface definition. A rule library includes external and internal rules which characterize color transformation workflows. Each external rule is associated with function modules. An interface receives factual input including factual input derived from source-side color image data. A rule engine determines a sequence of function modules and sources of parameters by using the factual input and the plural and external rules in the rule library, and builds the color transformation workflow from the determined sequence of function modules and sources of parameters.

52 Claims, 5 Drawing Sheets

OTHER PUBLICATIONS

J. Giarratano, "Clips: User's Guide", Quicksilver Beta, available at <http://clipsrules.sourceforge.net/documentation/v630/ug.pdf>, Dec. 31, 2007.

U.S. Appl. No. 12/696,033, filed Jan. 28, 2010, Inventors: Rocklin Sloan and John Haikin.

Derhak, et al., "ICC Votable Proposal Submission: Alternative Connection Spaces", Version 0.9, 2006, International Color Consortium.

Derhak, "ICC Alternative Connection Space (ACS) Registration: Spectral Reflectance ACS", Version 0.1, 2006, International Color Consortium.

Derhak, "ICC Alternative Connection Space (ACS) Registration: Black Generation ACS", Version 0.1, 2006, International Color Consortium.

Derhak, et al., "ICC Votable Proposal Submission: Alternative Connection Spaces", Version 0.8, 2006, International Color Consortium.

Derhak, et al., "ICC Votable Proposal Submission: Alternative Connection Spaces and MPE Extensions", Version 0.5, 2006, International Color Consortium and MPE.

Derhak, et al., "ICC Votable Proposal Submission: Alternative Connection Spaces and MPE Extensions", Version 0.3, 2006, International Color Consortium.

M. Bourgoin, "Windows Color System: Evolution in the Microsoft Color Management Ecosystem", 2005, Microsoft Corporation.

D. McDowell, "Process Control Characterization Data Color Management Profiles: What, When & How They Are Related", IPA Bulletin, 2004, pp. 26 to 32.

* cited by examiner

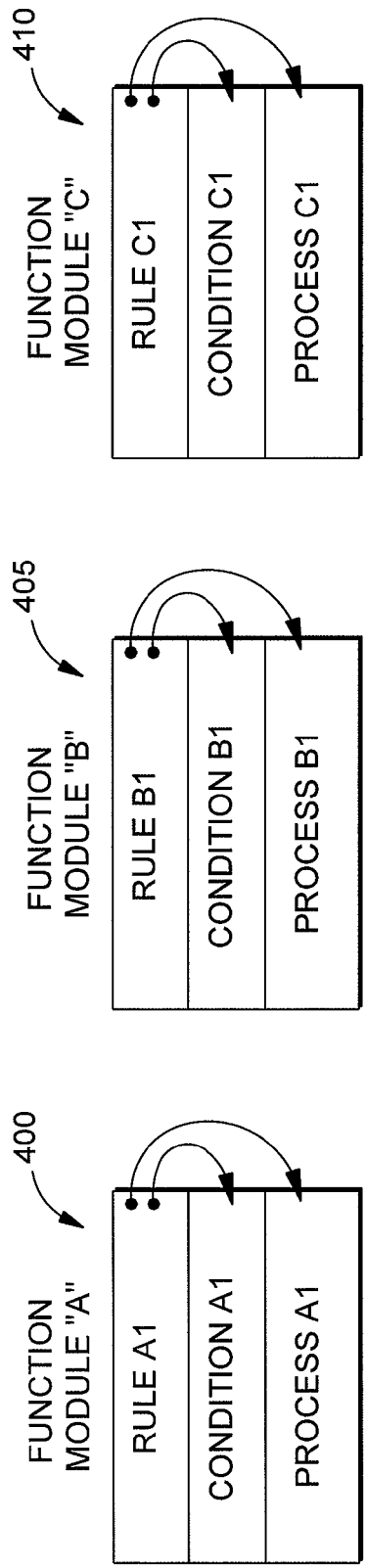
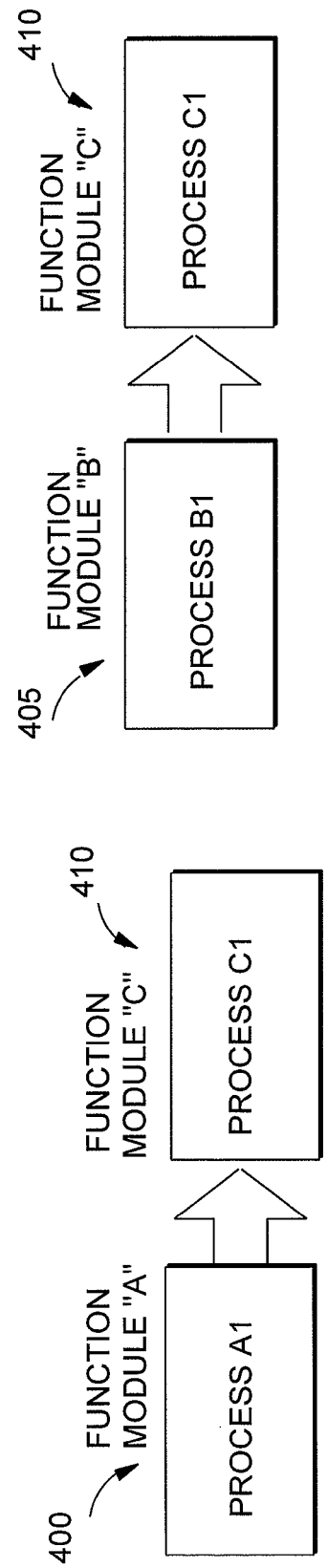
FIG. 4A
FIG. 4B
FIG. 4C

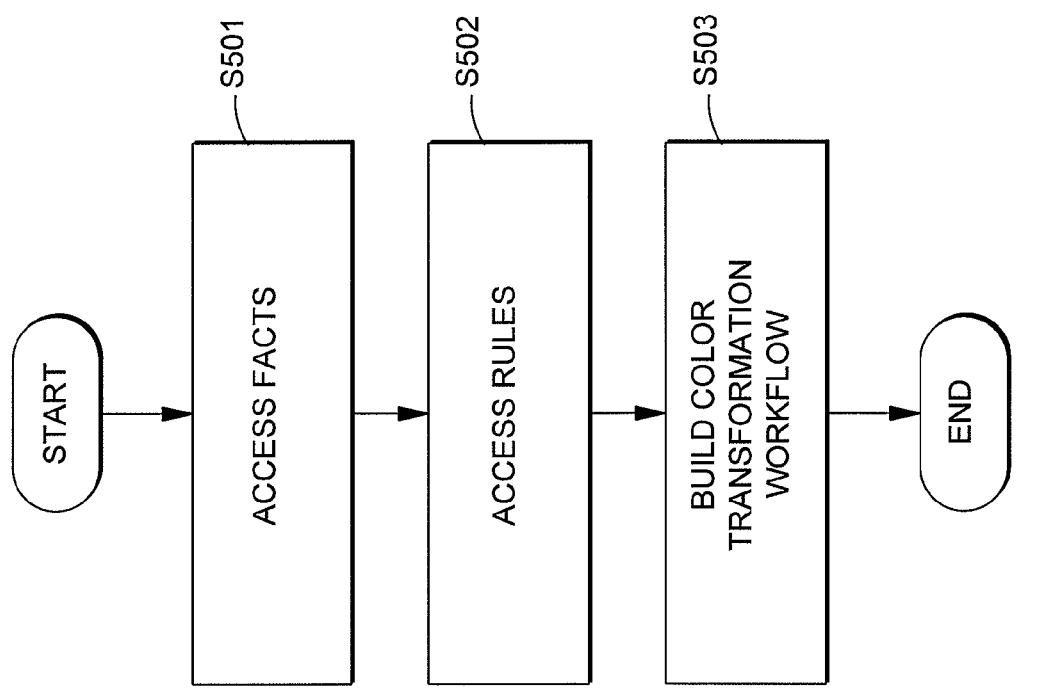

RULE-BASED COLOR MANAGEMENT AND IMAGE PROCESSING SYSTEM

FIELD

The present disclosure relates to an architecture for a color management system, and more particularly relates to a color management system having a modularized architecture which builds a color transformation workflow for transforming source-side color image data into corresponding destination-side color image data.

BACKGROUND

Color management systems are provided to convert color between source and destination color device representations of the color such that the appearance of color fidelity is maintained.

Color management systems are ordinarily structured to exhibit fixed functionality and to behave in a fixed manner. In other words, the processing of a color takes a fixed functional route through various color transform modules. Some color management systems accept parameters for the transform modules, which allow for a fine-tuning adjustment in the degree or amount of transformation, even though the nature of the transform remains unchanged. But in general, functionality of color management systems is ordinarily rigid and inflexible, except in the supply of parameters which drive functionality.

As one example, the Windows Color System (WCS) is a measurement-based color management system in which devices are represented by a combination of measurement information stored in a profile and a device model. More specifically, a device model, an appearance model and a gamut mapping model are selected, together with an inverse device model and an inverse appearance model. Parameters which are stored in profiles are provided to each model in order to drive color management.

Thus, similar to other typical color management systems, the color management workflow of WCS is fixed and inflexible. Accordingly, it is not usually possible to accommodate a change in the functionality of WCS, such as the introduction of a new color space, for the reason that such changes would entail new color transforms, new interfaces, and other changes to the WCS workflow.

SUMMARY

Recently, various color management technologies have emerged which do not typically fit into existing color management systems. Because typical color management systems are often inflexible, it is ordinarily necessary to build a new color management system in order to accommodate new color management techniques. For example, some emerging color management techniques involve spectral image data, and it is ordinarily necessary to build a new color management system in order to introduce transforms in to and out of a spectral color space.

Extending the capabilities of a color management system is becoming increasingly important due to advances in color technologies. Current color management systems, which are typically based on colorimetric or appearance based color transformations, are not ordinarily adequate for performing image-based color management, multispectral color management, or sophisticated tone-mapping techniques that are being developed for improved image reproduction.

The foregoing situation is addressed through the provision of a modular color management system architecture that uses a rule engine which flexibly builds customized color management transformation sequences by sequentially arranging function modules which encapsulate color processing functionalities, such that new functionalities and new color spaces can be easily accommodated.

Thus, in an example embodiment described herein, a color transformation workflow is built for transforming source-side color image data into corresponding destination-side color image data. A module library includes plural module entries each corresponding to a respective function module which implements color processing functionality. Each module entry comprises at least a module locator specifying a location for the function module. A profile library includes plural profile entries each corresponding to a respective source of parameters that characterize a function module. Each profile entry comprises at least a profile locator specifying a location for the source of parameters, and a profile interface definition which specifies an interface for supply of the parameters to the function module characterized thereby. For at least some of the module entries of the module library, the module entry further comprises a profile interface definition which specifies an interface for supply of parameters which characterize the function module.

A rule library includes entries for plural external rules and entries for plural internal rules. Each such external rule is associated with function modules located by module entries in the module library, and the external rules and the internal rules characterize color transformation workflows of the color management module. An interface receives factual input including factual input derived from the source-side color image data. A rule engine determines a sequence of function modules and sources of parameters from the module library and profile library, respectively, by using the factual input from the interface and the plural internal and external rules in the rule library. The rule engine builds the color transformation workflow from the determined sequence of function modules and sources of parameters.

By virtue of this arrangement, function modules which encapsulate color processing functionalities can be flexibly arranged to build color transformation workflows customized according to factual input together with rules provided to a rule engine to accommodate new color management techniques. Additionally, the function modules can be dynamically arranged on-the-fly based on the factual input together with rules provided to a rule engine. In this manner, a user can more easily and flexibly build color transformation workflows.

In example embodiments, each module entry further comprises at least one external rule. In some example embodiments, for at least one of the profile entries of the profile library, the profile entry includes at least one external rule. In one example embodiment, for at least one of the profile entries of the profile library, the profile entry includes at least one function module, wherein each such function module includes at least one external rule.

In an example embodiment, each external rule specifies a rule condition that is used to determine whether the function module should be used, and a rule process that is executed when the rule condition is satisfied.

In some embodiments, the module library is updatable so as to permit introduction of new module entries after deployment of the color management module. Furthermore, in some embodiments, the rule library is updatable so as to permit introduction of new external rules and new internal rules after deployment of the color management module.

By virtue of providing an updatable module library, it is possible to add new color processing functionalities and new external and internal rules to the color management system, such that the color management system is extensible.

In example embodiments, the factual input received at the interface includes at least one of color data, environmental information, geographical information, and a desired output.

In some example embodiments, a fact database includes at least the received factual input, and the rule engine accesses the rule library and the fact database to derive a conclusion. In this case, the conclusion derived by the rule engine is the sequence of function modules and sources of parameters used to build the color transformation workflow.

In other example embodiments, each external rule and each internal rule is at least one of a rule for performing an action and a rule for deducing a consequence of the factual input.

In example embodiments, each external rule and each internal rule specifies a rule condition and a corresponding rule process. In this situation, for each rule condition that is satisfied, based on the received factual input, the rule engine executes the corresponding rule process which adds the respective function module and sources of parameters to the sequence of function modules.

In some example embodiments, the order in which the function modules appear in the sequence of function modules is determined by the order in which the corresponding rule process is executed by the rule engine. In this case, the order in which the rule processes are executed by the rule engine is determined by at least one of priorities of the corresponding rules and the received factual input.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 4A to 4C are views for explaining a sequence of function modules according to an example embodiment.

FIG. 5 is a flow diagram for explaining color processing in a modular color management module according to an example embodiment.

DETAILED DESCRIPTION

Figure 1:
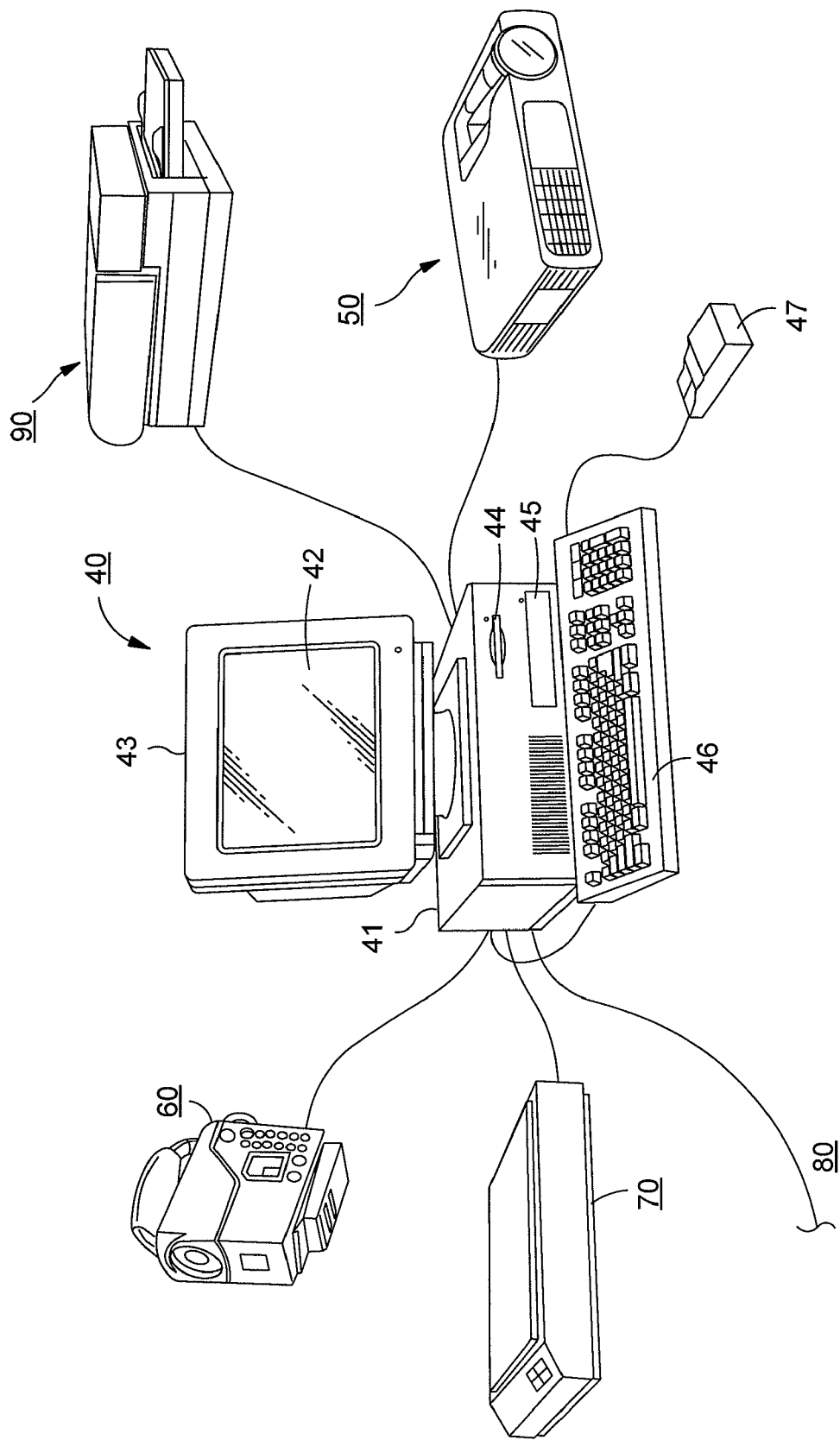
FIG. 1 is a representative view of computing equipment relevant to one example embodiment.

FIG. 1 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer fixed disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Projector 50 is a first example of a color output device, and in this example is an RGB or RGBW projector, such as a DLP™ digital projector or other display device that projects images in accordance with image data from host computer 41 onto a projection screen (not shown). Projector 50 may be an HDR device capable of projecting HDR images. Projector 50 projects images onto a display screen (not shown) by using additive light combinations of red (R), green (G) and blue (B) colorant lights. In addition, and particularly in a case of an HDR device, projector 50 also uses a white (W) light so as to increase the brightness/luminance of projected images and thereby project HDR images with good fidelity over a large dynamic range.

Printer 90 is a second example of a color output device, and in this example is a color laser printer which forms color images on a recording medium such as paper or transparencies or the like. Printer 90 forms color images using cyan, magenta, yellow and black colorants, although printers and other devices can be used which form color images using other colorant combinations that might or might not include black, such as a CMYKOG device.

Digital color scanner 70 is a first example of a color input device, and is provided for scanning documents and images and sending the corresponding image data to host computer 41.

Digital color camera 60 is a second example of a color input device, and is provided for sending digital image data to host computer 41.

Of course, host computer 41 may acquire digital image data from other sources such as a digital video camera, a local area network or the Internet via network interface 80. Likewise, host computer 41 may interface with other color output devices, such as color output devices accessible over network interface 80.

Figure 2:
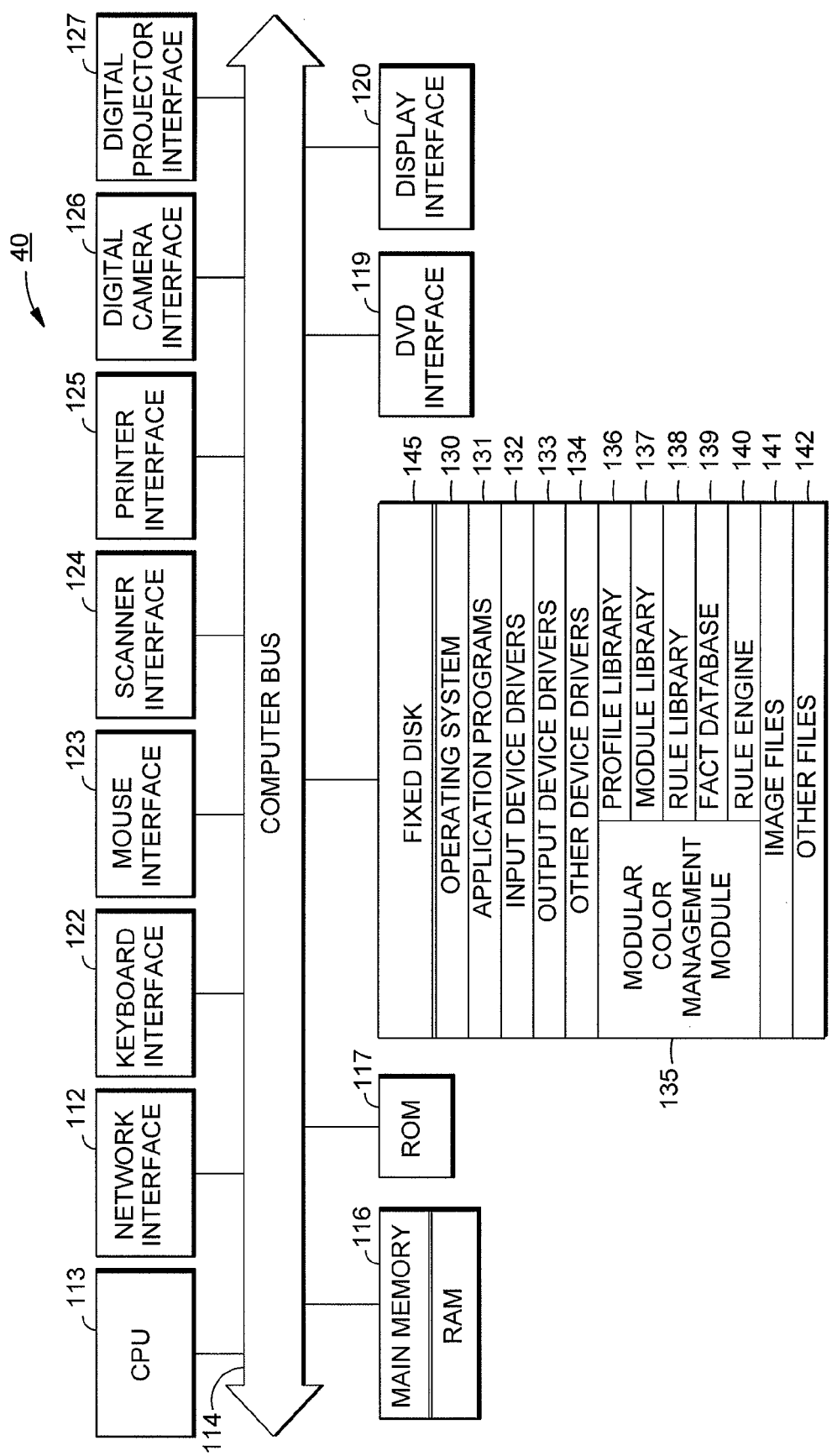
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which may be a multi-core CPU and which interfaces with computer bus 114. Also interfacing with computer bus 114 are fixed disk 45, network interface 112, random access memory (RAM) 116 for use as a main run-time transient memory, read only memory (ROM) 117, DVD disk interface 119, display interface 120 for monitor 43, keyboard interface 122 for keyboard 46, mouse interface 123 for pointing device 47, scanner interface 124 for scanner 70, printer interface 125 for printer 90, digital camera interface 126 for digital camera 60, and digital projector interface 127 for digital projector 50.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, fixed disk 45 contains computer-executable process steps for operating system 130, and application programs 131, such as word processing programs or graphic image management programs. Fixed disk 45 also contains computer-executable process steps for device drivers for software interface to devices, such as input device drivers 132, output device drivers 133, and other device drivers 134. Image files 141, including color image files, and other files 142 are available for output to color output devices and for manipulation by application programs.

Modular color management module (MCMM) 135 comprises computer-executable process steps executed by a computer for building a color transformation workflow for transforming source-side color image data into corresponding destination-side color image data. MCMM 135 builds the color transformation workflow so as to maintain good color fidelity for color images that are transferred from a source device to a destination device, such as the transfer of color image data from capture by digital camera 60 to display by projector 50. It should be appreciated that MCMM 135 is not limited to color transformation workflows between real devices, and that MCMM 135 also builds the color transformation workflow so as to maintain good color fidelity for color images that are transferred between any type of color space, such as, for example, a real device color space, a mathematical color space (e.g., sRGB, scRGB, ProPhoto, AdobeRGB), and the like. As shown in FIG. 2, MCMM 135 includes, at least, profile library 136, module library 137, rule library 138, fact database 139 and rule engine 140.

Module library 137 includes plural module entries each corresponding to a respective function module which implements color processing functionality. For example, a function module may encapsulate color management operations such as device modeling, color appearance modeling, or gamut mapping. The function modules are used by MCMM 135 to construct the color transformation workflow.

Each module entry includes at least a module locator specifying a location for the function module so that the function module itself is not necessarily part of the module library 137. This permits the function module to be located remotely of module library 137. In addition, in this example embodiment, each module entry further includes at least one external rule that specifies a rule condition and a corresponding rule process. The rule condition and rule process of the rule reference executable steps in the module that are executed by the rule engine in order to determine which processes should be executed and in what order.

In addition, for at least some of the module entries of the module library, the module entry further includes a profile interface definition which specifies an interface for supply of parameters which characterize the function module.

A function module can be accessed through a variety of sources. In the example embodiment, function modules are built-in to the color management system and stored on fixed disk 45. In other embodiments, function modules are provided as plug-ins or embedded into profile entries. Furthermore, function modules can be implemented as machine-code programs or as interpretive code using either pseudo-code or compiled source code, or a combination thereof.

In example embodiments, module library 137 is updatable so as to permit the introduction of new module entries after deployment of the color management module.

Profile library 136 includes plural profile entries, each corresponding to a respective source of parameters that characterize a function module. Each profile entry includes at least a profile locator specifying a location for the source of parameters, so that the profile entry itself is not necessarily part of profile library 136. This permits the profile entry to be located remotely from profile library 136. In addition, each profile entry further includes at least a profile interface definition which specifies an interface for supply of the parameters to the function module characterized thereby. In addition, for at least some of the profile entries of the profile library, the profile entry includes plural profile interface definitions. In the example embodiment, profile interface definitions are text interfaces. In other embodiments, profile interface definitions are binary interfaces or network interfaces.

In this example embodiment, for at least one of the profile entries of the profile library 136, the profile entry includes at least one external rule. In other embodiments, for at least one of the profile entries of the profile library, the profile entry includes at least one function module, wherein each such function module includes at least one external rule.

In some embodiments, profile library 136 comprises computer-executable process steps executed by a computer for accessing the profile entries. Furthermore, a profile interface definition may be constructed to accommodate for active feedback, for example, such that a profile entry may be calibrated.

Rule library 138 includes entries for plural external rules and entries for plural internal rules. Each external rule is associated with function modules located by module entries in module library 137. In an example embodiment, external rules are included in function modules. The external rules and the internal rules characterize color transformation workflows of the color management module. In some embodiments, each external rule specifies a rule condition that is used to determine whether the function module should be used, and a rule process that is executed when the rule condition is satisfied. In one example embodiment, each external rule and each internal rule is at least one of a rule for performing an action and a rule for deducing a consequence of the factual input.

In some example embodiments, rule library 138 is updatable so as to permit introduction of new external rules and new internal rules after deployment of the color management module. Rule library 138 will be discussed in further detail below with respect to FIG. 4.

Fact database 139 includes at least factual input received through the interface, including factual input derived from the source-side color image data. In example embodiments, the factual input received at the interface includes at least one of color data, environmental information, geographical information and a desired output.

In this example embodiment, profile library 136, module library 137, rule library 138 and fact database 139 are stored in fixed disk 45 as shown in FIG. 2. In other embodiments, profile library 136, module library 137, rule library 138 and fact database 139 can be stored inside of devices (e.g., digital camera 60, scanner 70 or printer 90), inside of ROM 117, or inside of any other suitable storage device. Of course, profile library 136, module library 137, rule library 138 and fact database 139 can be stored in one device, or can be split up and distributed among several devices.

Rule engine 140 generally comprises computer-executable process steps that determine a sequence of function modules and sources of parameters from the module library and profile library, respectively, by using the factual input from the interface and the plural internal and external rules in the rule library. Rule engine 140 builds the color transformation workflow from the determined sequence of function modules and sources of parameters.

The computer-executable process steps for MCMM 135 may be configured as a part of operating system 130, as part of an output device driver such as a printer driver, or as a stand-alone application program such as a color management system. They may also be configured as a plug-in or dynamic link library (DLL) to the operating system, device driver or application program. For example, MCMM 135 according to example embodiments may be incorporated in an output device driver for execution in a computing device, such as a printer driver, embedded in the firmware of an output device, such as a printer, or provided in a stand-alone color management application for use on a general purpose computer. In one example embodiment described herein, MCMM 135 is incorporated directly into the operating system for general purpose host computer 41. It can be appreciated that the present disclosure is not limited to these embodiments and that the disclosed color management module may be used in other environments in which color management is used.

Figure 3:
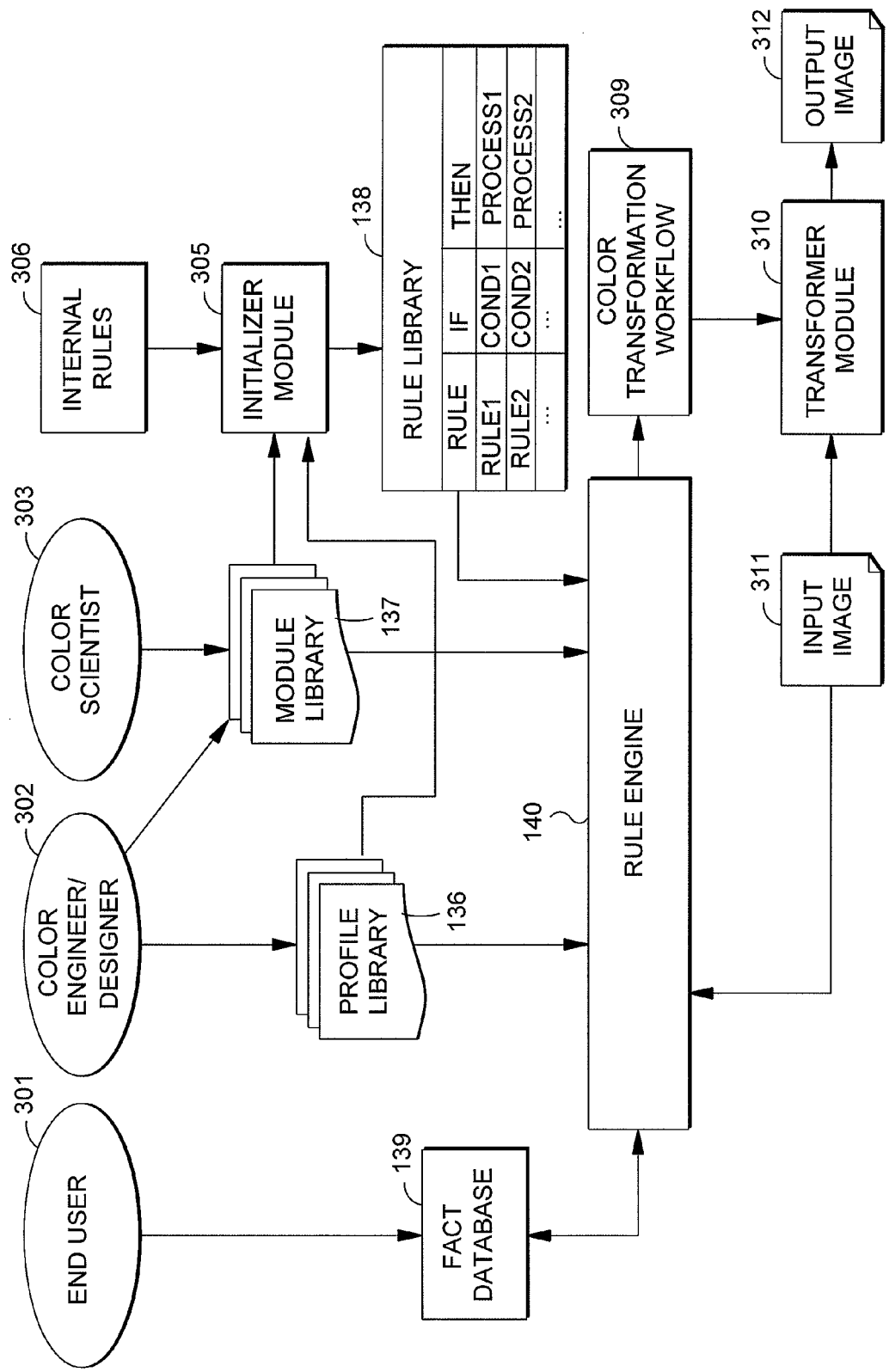
FIG. 3 is a view for explaining software architecture of a modular color management module according to an example embodiment.

FIG. 3 is a view for explaining software architecture of modular color management module (MCMM) 135. In the embodiment depicted in FIG. 3, there are three types of users interfacing with MCMM 135, namely an end user 301, a color engineer/designer 302 and a color scientist 303.

End user 301 specifies a variety of factual input which is stored in fact database 139. Factual input includes, for example, color data, including color data for input image 311, environmental information, geographical information and a desired output. In this embodiment, the factual input is received from a user through a user interface. Factual input is also derived from the source-side color image data for input image 311. In some embodiments, factual input also includes a desired processing speed, a preference for color accuracy, an availability of resources, and other user requirements.

Color engineer/designer 302 creates new profile entries for profile library 136, such as a profile entry for printer 90 or digital camera 60. As previously discussed, profile entries correspond to a source of parameters that characterize a particular function module, and each profile entry has a profile interface definition specifying an interface for the supply of parameters to the function module characterized by the particular profile entry. Thus, color engineer/designer 302 has the ability to create and add new profile interface definitions such that profile library 136 is extensible. It should be appreciated that the architecture of MCMM 135 is such that color engineer/designer 302 is able to add new profile interface definitions after deployment of MCMM 135 to end users in the field, without the need to alter or reconfigure the MCMM 135 itself, such that the core processing functionality of MCMM 135 remains unchanged.

In addition, color engineer/designer 302 creates new external rules and new internal rules 306 and modifies existing external rules and existing internal rules 306. Each external rule is associated with function modules in module library 137, and internal rules 306 are included within MCMM 135. Thus, color engineer/designer 302 has the ability to create and add new external and internal rules such that both module library 137 and internal rules 306 are extensible. It should be appreciated that the architecture of MCMM 135 is such that color engineer/designer 302 is able to add new external and internal rules after deployment of MCMM 135 to end users in the field, without the need to alter or reconfigure the MCMM 135 itself, such that the core processing functionality of MCMM 135 remains unchanged.

Color scientist 303 creates new function modules for module library 137. As previously discussed, module library 137 includes plural module entries each corresponding to a respective function module which implements color processing functionality. Thus, color scientist 303 has the ability to add new color processing functionalities by generating new function modules, such that module library 137 is extensible. In this way, module library 137 can be expanded to include new and currently unknown color processing techniques, as well as existing color processing techniques. Each module entry includes at least a module locator. Some of the module entries also include a profile interface definition. Thus, color scientist 303 also has the ability to add new interface definitions to module library 137. It should be appreciated that the architecture of MCMM 135 is such that color scientist 303 is able to add new function modules after deployment of MCMM 135 to end users in the field, without the need to alter or reconfigure the MCMM 135 itself, such that the core processing functionality of MCMM 135 remains unchanged.

In the example embodiment, end user 301, color engineer/designer 302 and color scientist 303 interface with MCMM 135 by using a user interface. Any convenient type of user interface may be used, including, for example, graphic or non-graphic based user interfaces.

MCMM 135 includes initializer module 305 and rule engine 140. Initializer module 305 receives, as input, entries for plural external rules included in module library 137 and included in profile library 136 as well as entries for plural internal rules 306 included in MCMM 135. Based on the received entries, initializer module 305 outputs rule library 138. More specifically, initializer module 305 reads out entries for the external rules included in module library 137 and profile library 136 and the entries for the internal rules 306 included in MCMM 135 in order to build rule library 138.

In this embodiment, each external and internal rule stored in rule library 138 specifies a rule condition and a corresponding rule process. In this case, rule library 138 includes the rule together with the rule condition and the rule process. If a new external rule is added to module library 137, for example when color scientist 303 creates a new function module, initializer module 305 finds the new external rule and adds the external rule and its corresponding rule condition and rule process to rule library 138. Similarly, if a new internal rule 306 is added to MCMM 135, initializer 305 finds the new internal rule 306 and adds the internal rule 306 and its corresponding rule condition and rule process to rule library 138. In the example embodiment, rule library 138 is a database which identifies the external or internal rule and the corresponding rule condition and rule process for each respective rule entry.

Rule engine 140 determines a sequence of function modules and sources of parameters from module library 137 and profile library 136, respectively, by using the factual input stored in fact database 139 and the internal and external rules in the rule library 138, and builds color transformation workflow 309 from the determined sequence of function modules and sources of parameters. In particular, rule engine 40 receives external and internal rules from rule library 138 and factual input stored in fact database 139 and derives a conclusion, which is the sequence of function modules and sources of parameters used to build color transformation workflow 309.

More specifically, for each rule condition that is satisfied, based on the factual input received by the interface and stored in fact database 139, rule engine 140 executes the corresponding rule process which adds the respective function module and sources of parameters to the sequence of function modules. The order in which the function modules appear in the sequence of function modules is determined by the order in which the corresponding rule process is executed by rule engine 140. In the example embodiment, the order in which the rule processes are executed by rule engine 140 is determined by priorities of the corresponding rules and the factual input.

For example, Function Modules "A", "B" and "C" are shown in FIGS. 4A, 4B and 4C. As shown in FIG. 4A, Function Module "A" (400) includes rule A1, wherein rule A1 includes rule condition A1 and rule process A1. Similarly, Function Module "B" (405) includes rule B1, wherein rule B1 includes rule condition B1 and rule process B1, and Function Module "C" (410) includes rule C1, wherein rule C1 includes rule condition C1 and rule process C1.

As shown in FIG. 4B, when rule condition A1 and rule condition C1 are satisfied based on the factual input stored in fact database 139, but rule condition B1 is not satisfied, rule engine 140 executes rule process A1 and rule process C1 which adds function module "A" and function module "C" to the sequence of function modules. The order in which function modules "A" and "C" appear in the sequence is determined by the order in which the rule processes are executed, which is determined by priorities of the corresponding rules and factual input.

As shown in FIG. 4C, when rule condition B1 and rule condition C1 are satisfied based on the factual input stored in fact database 139, but rule condition A1 is not satisfied, rule engine 140 executes rule process B1 and rule process C1 which adds function module "B" and function module "C" to the sequence of function modules. The order in which function modules "B" and "C" appear in the sequence is determined by the order in which the rule processes are executed, which is determined by priorities of the corresponding rules and factual input.

A person having ordinarily skill in the art will recognize that the precise nature of rule engine 140 is flexible and that a large variety of rule engines are suitable. As one example, a rule engine such as the CLIPS ("C Language Integrated Production System) rule engine may be used in order to access fact database 139 and rule library 139 in order to determine the sequence of function modules and sources of parameters. See Joseph C. Giarratano, "CLIPS User's Guide", Quicksilver Beta, Dec. 31, 2007, available at <http://clipsrules.sourceforge.net/documentation/v630/ug.pdf, the entire contents of which are incorporated by reference as if set forth in full herein. As a second example, a rule engine using a RETE algorithm may be used. See Chan, Chung, "Rules and Rule Chaining", Massachusetts Institute of Technology, last modified on Oct. 4, 2001, available at <http://web.mit.edu/chungc/6.034/11.html>, the entire contents of which are incorporated by reference as if set forth in full herein.

Input image 311 is a color image which includes source-side color image data. The source-side color image data is transformed into corresponding destination-side color image data by MCMM 135. In the example embodiment, input image 311 is stored in fixed disk 45. However, input image 311 can be stored in any suitable storage device, such as a removable storage device, in other example embodiments.

Color transformation workflow 309 generates transformer module 310. Transformer module 310 receives, as input, input image 311. Transformer module 310 transforms source-side color image data for input image 311 into corresponding destination-side color image data for output image 312.

FIG. 5 is a flow diagram for explaining color processing in MCMM 135, in relation to the architecture depicted in FIG. 4. The process steps shown in FIG. 5 are computer-executable process steps stored on a computer-readable memory medium such as at 135 on fixed disk 45, and are executed by CPU 113 of host computer 41, so as to implement a color management module which builds a color transformation workflow for transforming source-side color image data into corresponding destination-side color image data. Briefly, according to the process steps shown in FIG. 5, a sequence of function modules and sources of parameters from module library 137 and profile library 136, respectively, is determined by using factual input from the interface and the plural internal and external rules in rule library 138.

In more detail, rule engine 140 accesses the factual input stored in fact database 139 in step S501, and accesses the external and internal rules in rule library 138 in step S502. In step S503, rule engine 140 determines the sequence of function modules and sources of parameters from module library 137 and profile library 136, respectively, by using the factual input in fact database 139 and the internal and external rules in rule library 138, and builds color transformation workflow 309 from the determined sequence of function modules and sources of parameters.

As one example, for each rule associated with a function module, the rule condition is a condition that is satisfied if the factual inputs in the fact database indicate that there is color data that matches the rule condition of the corresponding function module. In the case where such a rule condition is satisfied, rule engine 140 executes the corresponding rule process, which adds the corresponding function module and sources of parameters to the sequence of function modules and sources of parameters used to build color transformation workflow 309. In particular, if a rule condition is satisfied if XYZ color data is available and if the fact database includes facts that indicate that XYZ color data is available, then rule engine 140 executes the corresponding rule process to add the associated function module to the sequence of function modules. Rule engine 140 executes the rule process such that the associated function module is added to the sequence of function modules such that it receives the color data that satisfies the corresponding rule condition.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A color management module which builds a color transformation workflow for transforming source-side color image data into corresponding destination-side color image data, the color management module comprising:
   a module library which includes plural module entries each corresponding to a respective function module which implements color processing functionality, wherein each module entry comprises at least a module locator specifying a location for the function module;
   a profile library which includes plural profile entries each corresponding to a respective source of parameters that characterize a function module, wherein each profile entry comprises at least a profile locator specifying a location for the source of parameters, and a profile interface definition which specifies an interface for supply of the parameters to the function module characterized thereby;

wherein for at least some of the module entries of the module library, the module entry further comprises a profile interface definition which specifies an interface for supply of parameters which characterize the function module;

a rule library which includes entries for plural external rules and entries for plural internal rules, wherein each such external rule is associated with function modules located by module entries in the module library, and wherein the external rules and the internal rules characterize color transformation workflows of the color management module;

an interface constructed to receive factual input including factual input derived from the source-side color image data; and a rule engine constructed to determine a sequence of function modules and sources of parameters from the module library and profile library, respectively, by using the factual input from the interface and the plural internal and external rules in the rule library, wherein the rule engine builds the color transformation workflow from the determined sequence of function modules and sources of parameters.

2. A color management module according to claim 1, wherein each module entry further comprises at least one external rule.

3. A color management module according to claim 1, wherein for at least one of the profile entries of the profile library, the profile entry includes at least one external rule.

4. A color management module according to claim 1, wherein for at least one of the profile entries of the profile library, the profile entry includes at least one function module, wherein each such function module includes at least one external rule.

5. A color management module according to claim 1, wherein each external rule specifies a rule condition that is used to determine whether the function module should be used, and a rule process that is executed when the rule condition is satisfied.

6. A color management module according to claim 1, wherein the module library is updatable so as to permit introduction of new module entries after deployment of the color management module.

7. A color management module according to claim 1, wherein the rule library is updatable so as to permit introduction of new external rules and new internal rules after deployment of the color management module.

8. A color management module according to claim 1, wherein the factual input received at the interface includes at least one of color data, environmental information, geographical information, and a desired output.

9. A color management module according to claim 1, further comprising a fact database which includes at least the received factual input,
wherein the rule engine accesses the rule library and the fact database to derive a conclusion, and wherein the conclusion derived by the rule engine is the sequence of function modules and sources of parameters used to build the color transformation workflow.

10. A color management module according to claim 9, wherein each external rule and each internal rule is at least one of a rule for performing an action and a rule for deducing a consequence of the factual input.

11. A color management module according to claim 9, wherein each external rule and each internal rule specifies a rule condition and a corresponding rule process, and wherein for each rule condition that is satisfied, based on the received factual input, the rule engine executes the corresponding rule process which adds the respective function module and sources of parameters to the sequence of function modules.

12. A color management module according to claim 11, wherein the order in which the function modules appear in the sequence of function modules is determined by the order in which the corresponding rule process is executed by the rule engine.

13. A color management module according to claim 12, wherein the order in which the rule processes are executed by the rule engine is determined by at least one of priorities of the corresponding rules and the received factual input.

14. A color management method for building a color transformation workflow for transforming source-side color image data into corresponding destination-side color image data;
wherein the color management method is executable by a computer which has access to a module library, to a profile library, and to a rule library,
wherein the module library includes plural module entries each corresponding to a respective function module which implements color processing functionality, wherein each module entry comprises at least a module locator specifying a location for the function module, wherein for at least some of the module entries of the module library, the module entry further comprises a profile interface definition which specifies an interface for supply of parameters which characterize the function module,
wherein the profile library includes plural profile entries each corresponding to a respective source of parameters that characterize a function module, wherein each profile entry comprises at least a profile locator specifying a location for the source of parameters, and a profile interface definition which specifies an interface for supply of the parameters to the function module characterized thereby,
wherein the rule library includes entries for plural external rules and entries for plural internal rules, wherein each such external rule is associated with function modules located by module entries in the module library, and wherein the external rules and the internal rules characterize color transformation workflows of the color management module, and
wherein the color management method comprises:
receiving factual input including factual input derived from the source-side color image data;
determining a sequence of function modules and sources of parameters from the module library and profile library, respectively, by using the factual input from the interface and the plural internal and external rules in the rule library; and
building the color transformation workflow from the determined sequence of function modules and sources of parameters.

15. A color management method according to claim 14, wherein each module entry further comprises at least one external rule.

16. A color management method according to claim 14, wherein for at least one of the profile entries of the profile library, the profile entry includes at least one external rule.

17. A color management method according to claim 14, wherein for at least one of the profile entries of the profile library, the profile entry includes at least one function module, wherein each such function module includes at least one external rule.

18. A color management method according to claim 14, wherein each external rule specifies a rule condition that is used to determine whether the function module should be used, and a rule process that is executed when the rule condition is satisfied.

19. A color management method according to claim 14, wherein the module library is updatable so as to permit introduction of new module entries after deployment of the color management module.

20. A color management method according to claim 14, wherein the rule library is updatable so as to permit introduction of new external rules and new internal rules after deployment of the color management module.

21. A color management method according to claim 14, wherein the factual input received at the interface includes at least one of color data, environmental information, geographical information, and a desired output.

22. A color management method according to claim 14, wherein the computer further has access to a fact database, wherein the fact database includes at least the received factual input,
wherein the rule engine accesses the rule library and the fact database to derive a conclusion, and wherein the conclusion derived by the rule engine is the sequence of function modules and sources of parameters used to build the color transformation workflow.

23. A color management method according to claim 22, wherein each external rule and each internal rule is at least one of a rule for performing an action and a rule for deducing a consequence of the factual input.

24. A color management method according to claim 22, wherein each external rule and each internal rule specifies a rule condition and a corresponding rule process, and wherein for each rule condition that is satisfied, based on the received factual input, the rule engine executes the corresponding rule process which adds the respective function module and sources of parameters to the sequence of function modules.

25. A color management method according to claim 24, wherein the order in which the function modules appear in the sequence of function modules is determined by the order in which the corresponding rule process is executed by the rule engine.

26. A color management method according to claim 25, wherein the order in which the rule processes are executed by the rule engine is determined by at least one of priorities of the corresponding rules and the received factual input.

27. A color management apparatus for building a color transformation workflow for transforming source-side color image data into corresponding destination-side color image data, the color management apparatus comprising:
a computer-readable memory which stores computer-executable process steps, a module library, a profile library and a rule library, and
a processor constructed to execute the computer-executable process steps stored in the memory;
wherein the module library includes plural module entries each corresponding to a respective function module which implements color processing functionality, wherein each module entry comprises at least a module locator specifying a location for the function module, wherein for at least some of the module entries of the module library, the module entry further comprises a profile interface definition which specifies an interface for supply of parameters which characterize the function module,
wherein the profile library includes plural profile entries each corresponding to a respective source of parameters that characterize a function module, wherein each profile entry comprises at least a profile locator specifying a location for the source of parameters, and a profile interface definition which specifies an interface for supply of the parameters to the function module characterized thereby,
wherein the rule library includes entries for plural external rules and entries for plural internal rules, wherein each such external rule is associated with function modules located by module entries in the module library, and wherein the external rules and the internal rules characterize color transformation workflows of the color management module, and
wherein the process steps stored in the memory cause the processor to convert source-side color image data into corresponding destination-side color image data, and include computer-executable process steps to:
receive factual input including factual input derived from the source-side color image data;
determine a sequence of function modules and sources of parameters from the module library and profile library, respectively, by using the factual input from the interface and the plural internal and external rules in the rule library; and
build the color transformation workflow from the determined sequence of function modules and sources of parameters.

28. A color management apparatus according to claim 27, wherein each module entry further comprises at least one external rule.

29. A color management apparatus according to claim 27, wherein for at least one of the profile entries of the profile library, the profile entry includes at least one external rule.

30. A color management apparatus according to claim 27, wherein for at least one of the profile entries of the profile library, the profile entry includes at least one function module, wherein each such function module includes at least one external rule.

31. A color management apparatus according to claim 27, wherein each external rule specifies a rule condition that is used to determine whether the function module should be used, and a rule process that is executed when the rule condition is satisfied.

32. A color management apparatus according to claim 27, wherein the module library is updatable so as to permit introduction of new module entries after deployment of the color management module.

33. A color management apparatus according to claim 27, wherein the rule library is updatable so as to permit introduction of new external rules and new internal rules after deployment of the color management module.

34. A color management apparatus according to claim 27, wherein the factual input received at the interface includes at least one of color data, environmental information, geographical information, and a desired output.

35. A color management apparatus according to claim 27, wherein the computer-readable memory further stores a fact database, wherein the fact database includes at least the received factual input,
wherein the rule engine accesses the rule library and the fact database to derive a conclusion, and wherein the conclusion derived by the rule engine is the sequence of function modules and sources of parameters used to build the color transformation workflow.

36. A color management apparatus according to claim 35, wherein each external rule and each internal rule is at least one of a rule for performing an action and a rule for deducing a consequence of the factual input.

37. A color management apparatus according to claim 35, wherein each external rule and each internal rule specifies a rule condition and a corresponding rule process, and wherein for each rule condition that is satisfied, based on the received factual input, the rule engine executes the corresponding rule process which adds the respective function module and sources of parameters to the sequence of function modules.

38. A color management apparatus according to claim 37, wherein the order in which the function modules appear in the sequence of function modules is determined by the order in which the corresponding rule process is executed by the rule engine.

39. A color management apparatus according to claim 38, wherein the order in which the rule processes are executed by the rule engine is determined by at least one of priorities of the corresponding rules and the received factual input.

40. A computer-readable memory medium on which is stored computer-executable process steps for causing a computer to build a color transformation workflow for transforming source-side color image data into corresponding destination-side color image data;
the computer-readable memory medium further storing a module library, a profile library, and a rule library,
wherein the module library includes plural module entries each corresponding to a respective function module which implements color processing functionality, wherein each module entry comprises at least a module locator specifying a location for the function module, wherein for at least some of the module entries of the module library, the module entry further comprises a profile interface definition which specifies an interface for supply of parameters which characterize the function module,
wherein the profile library includes plural profile entries each corresponding to a respective source of parameters that characterize a function module, wherein each profile entry comprises at least a profile locator specifying a location for the source of parameters, and a profile interface definition which specifies an interface for supply of the parameters to the function module characterized thereby,
wherein the rule library includes entries for plural external rules and entries for plural internal rules, wherein each such external rule is associated with function modules located by module entries in the module library, and wherein the external rules and the internal rules characterize color transformation workflows of the color management module, and
wherein the process steps comprise:
receiving factual input including factual input derived from the source-side color image data;
determining a sequence of function modules and sources of parameters from the module library and profile library, respectively, by using the factual input from the interface and the plural internal and external rules in the rule library; and
building the color transformation workflow from the determined sequence of function modules and sources of parameters.

41. A computer-readable memory medium according to claim 40, wherein each module entry further comprises at least one external rule.

42. A computer-readable memory medium according to claim 40, wherein for at least one of the profile entries of the profile library, the profile entry includes at least one external rule.

43. A computer-readable memory medium according to claim 40, wherein for at least one of the profile entries of the profile library, the profile entry includes at least one function module, wherein each such function module includes at least one external rule.

44. A computer-readable memory medium according to claim 40, wherein each external rule specifies a rule condition that is used to determine whether the function module should be used, and a rule process that is executed when the rule condition is satisfied.

45. A computer-readable memory medium according to claim 40, wherein the module library is updatable so as to permit introduction of new module entries after deployment of the color management module.

46. A computer-readable memory medium according to claim 40, wherein the rule library is updatable so as to permit introduction of new external rules and new internal rules after deployment of the color management module.

47. A computer-readable memory medium according to claim 40, wherein the factual input received at the interface includes at least one of color data, environmental information, geographical information, and a desired output.

48. A computer-readable memory medium according to claim 40, wherein the computer-readable memory medium further stores a fact database, wherein the fact database includes at least the received factual input,
wherein the rule engine accesses the rule library and the fact database to derive a conclusion, and wherein the conclusion derived by the rule engine is the sequence of function modules and sources of parameters used to build the color transformation workflow.

49. A computer-readable memory medium according to claim 48, wherein each external rule and each internal rule is at least one of a rule for performing an action and a rule for deducing a consequence of the factual input.

50. A computer-readable memory medium according to claim 48, wherein each external rule and each internal rule specifies a rule condition and a corresponding rule process, and wherein for each rule condition that is satisfied, based on the received factual input, the rule engine executes the corresponding rule process which adds the respective function module and sources of parameters to the sequence of function modules.

51. A computer-readable memory medium according to claim 50, wherein the order in which the function modules appear in the sequence of function modules is determined by the order in which the corresponding rule process is executed by the rule engine.

52. A computer-readable memory medium according to claim 51, wherein the order in which the rule processes are executed by the rule engine is determined by at least one of priorities of the corresponding rules and the received factual input.

* * * * *